US012639805B2

(12) United States Patent
Warey et al.

(10) Patent No.: US 12,639,805 B2
(45) Date of Patent: May 26, 2026

(54) METHOD TO AUTOMATE GAS LEAK DETECTION IN BATTERY MANUFACTURING USING DATA FROM OPTICAL GAS IMAGING SYSTEM

(71) Applicant: GM Global Technology Operations LLC, Detroit, MI (US)

(72) Inventors: Alok Warey, Novi, MI (US); Siddhartha Gupta, Rochester Hills, MI (US); Hassan Ghassemi-Armaki, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 340 days.

(21) Appl. No.: 18/519,619

(22) Filed: Nov. 27, 2023

(65) Prior Publication Data

US 2025/0173856 A1      May 29, 2025

(51) Int. Cl.
G06T 7/00         (2017.01)
G01M 3/04        (2006.01)
        (Continued)

(52) U.S. Cl.
CPC .............. G06T 7/001 (2013.01); G01M 3/04 (2013.01); G01M 3/38 (2013.01); G01N 21/85 (2013.01); G06T 7/13 (2017.01); G06T 7/70 (2017.01); G06V 10/44 (2022.01); G06V 10/50 (2022.01); G06V 10/764 (2022.01); G06V 10/82 (2022.01); G06V 20/41 (2022.01); G06V 20/46 (2022.01); H01M 10/04 (2013.01);
        (Continued)

(58) Field of Classification Search
CPC .. G06T 7/001; G06T 7/13; G06T 7/70; G06T 2207/10016; G06T 2207/20084; G01M 3/04; G01M 3/38; G06V 10/44; G06V 10/50; G06V 10/764; G06V 10/82; G06V 20/41; G06V 20/46; H01M 10/04; H01M 10/0404; H01M 10/4228; H01M 10/488; Y02E 60/10; G01N 21/85; G01N 2021/8578
See application file for complete search history.

(56) References Cited

U.S. PATENT DOCUMENTS

| | | | |
|---|---|---|---|
| 11,854,366 B1 * | 12/2023 | Thoma ..................... | H04Q 9/00 |
| 2013/0141571 A1 * | 6/2013 | Yasooka ................. | G01M 3/36 73/37.5 |

(Continued)

FOREIGN PATENT DOCUMENTS

| | | | | |
|---|---|---|---|---|
| CN | 112763164 A | 5/2021 | | |
| DE | 102015104874 A1 | 10/2015 | | |
| KR | 1020220115381 A | 8/2022 | | |
| WO | WO-2020090360 A1 * | 5/2020 | ............ | H01M 10/48 |

*Primary Examiner* — Jennifer Mehmood
*Assistant Examiner* — Jose M Torres
(74) *Attorney, Agent, or Firm* — Vivacqua Crane, PLLC

(57) ABSTRACT

An automated system to provide gas leak detection during battery manufacturing includes a battery system. A video of a gas leak occurring during a manufacturing stage of the battery system includes the gas leak as a gas vapor. A location of the gas leak is determined. A leak intensity value of the gas leak is identified to determine if the gas leak is minor and is less than or within a predetermined window or threshold permitting acceptance of the gas leak without repair, or if the gas leak requires further action including repair of the battery system.

7 Claims, 9 Drawing Sheets

(51) Int. Cl.

| | |
|---|---|
| *G01M 3/38* | (2006.01) |
| *G01N 21/85* | (2006.01) |
| *G06T 7/13* | (2017.01) |
| *G06T 7/70* | (2017.01) |
| *G06V 10/44* | (2022.01) |
| *G06V 10/50* | (2022.01) |
| *G06V 10/764* | (2022.01) |
| *G06V 10/82* | (2022.01) |
| *G06V 20/40* | (2022.01) |
| *H01M 10/04* | (2006.01) |
| *H01M 10/42* | (2006.01) |
| *H01M 10/48* | (2006.01) |

(52) U.S. Cl.
CPC ... *H01M 10/0404* (2013.01); *H01M 10/4228* (2013.01); *H01M 10/488* (2013.01); *G01N 2021/8578* (2013.01); *G06T 2207/10016* (2013.01); *G06T 2207/20084* (2013.01); *Y02E 60/10* (2013.01)

(56) References Cited

U.S. PATENT DOCUMENTS

| | | | | |
|---|---|---|---|---|
| 2014/0002639 A1* | 1/2014 | Cheben | G08B 21/14 | 348/135 |
| 2015/0292975 A1* | 10/2015 | Xu | G01N 21/3504 | 73/40.7 |
| 2016/0377502 A1* | 12/2016 | Xu | G01N 21/3504 | 73/40.7 |
| 2017/0336281 A1* | 11/2017 | Waxman | G01N 21/359 | |
| 2018/0266944 A1* | 9/2018 | Waxman | G01J 3/06 | |
| 2019/0340914 A1* | 11/2019 | Israelsen | G01M 3/04 | |
| 2020/0320659 A1* | 10/2020 | Whiting | G01M 3/38 | |
| 2021/0076006 A1* | 3/2021 | O'Neill | G06V 20/52 | |
| 2021/0123870 A1* | 4/2021 | Mahajan | H01M 10/488 | |
| 2021/0264584 A1* | 8/2021 | Zhang | G06T 7/0004 | |
| 2022/0128467 A1* | 4/2022 | Al-Rashidi | G01N 21/61 | |
| 2023/0177726 A1* | 6/2023 | Spears | G06V 10/26 | 382/100 |
| 2024/0219255 A1* | 7/2024 | Aseev | G01M 3/002 | |

* cited by examiner

1. IDENTIFY LEAK LOCATION $L_{xy}$ IN IMAGE.

2. COMPUTE $i = \underset{n}{ARGMIN} \| L_{xy} - l_{xy}^i \|$

3. MAP $l_{xy}^i$ TO PHYSICAL LOCATION USING CALIBRATION FILE.

1

METHOD TO AUTOMATE GAS LEAK DETECTION IN BATTERY MANUFACTURING USING DATA FROM OPTICAL GAS IMAGING SYSTEM

INTRODUCTION

The present disclosure relates to electric vehicle battery systems and identification of gas leaks occurring during manufacture of a rechargeable energy storage system (RESS), a battery cell, a battery module or a battery pack for electric vehicles.

Electric vehicles (EVs) including battery electric vehicles (BEVs), hybrid vehicles and/or fuel cell vehicles include one or more electric machines and a RESS or a battery system including on or more battery cells, battery modules, and/or battery packs. The RESS, battery cells, battery modules and/or battery packs are typically housed in enclosures that are hermetically sealed. Methods in current use to detect gas leakage from the enclosures during battery manufacture include gas sniffing such as helium sniffing, which are conducted manually and are therefore time consuming and inaccurate. In addition, helium gas sniffing can only identify general regions where a leak is located. Because identification of a specific leak location is necessary to perform leak correction such as weld repair, this method results in excessive time required for both leak detection and leak repair.

Thus, while current systems and methods to identify gas leaks occurring during battery manufacture achieve their intended purpose, there is a need for a new and improved system and method to automate gas leak detection during battery manufacturing.

SUMMARY

According to several aspects, an automated system to provide gas leak detection during battery manufacturing comprises a battery system defining a RESS, a battery cell, a battery module, or a battery pack. A video of a gas leak occurring during a manufacturing stage of the battery system includes the gas leak as a gas vapor. A location of the gas leak is determined. A leak intensity value of the gas leak is identified to determine if the gas leak is minor and is less than or within a predetermined window or threshold permitting acceptance of the gas leak without repair, or if the gas leak requires further action including repair of the battery system.

In another aspect of the present disclosure, a background frame having no gas leak present is saved. A sequential frame differencing of the video is compared to the background frame to define a frame where the gas leak was initially detected.

In another aspect of the present disclosure, a classifier model is applied to identify at least one frame of the video having the gas leak.

In another aspect of the present disclosure, a pixel threshold is applied to identify at least one frame of the video having the gas leak.

In another aspect of the present disclosure, a pixel to physical location map is applied to identify a gas leak location.

In another aspect of the present disclosure, a contour and bounding shape is applied to the frame where the gas leak was initially detected. A plurality of bounding shape coordinates is applied to the contour and bounding shape to identify a physical location map of the gas leak.

In another aspect of the present disclosure, an image processor applied to image data defining the location of the gas leak to identify the leak intensity value of the gas leak.

In another aspect of the present disclosure, a convolutional neural network (CNN) model and/or a recurrent neural network (RNN) model applied to image data defining the location of the gas leak to identify the leak intensity value of the gas leak.

In another aspect of the present disclosure, an object detection is performed during a detection phase to identify the gas leak; and a boundary is defined which encompasses the gas leak to define a location or position of the gas leak.

In another aspect of the present disclosure, a video of the gas leak image data is prepared. A frame-by-frame analysis of the image data is performed to identify a frame where the gas leak occurred.

According to several aspects, a method to perform automated battery gas leak detection comprises: collecting a video of a battery system having multiple video frames during a manufacturing stage of the battery system; detecting a gas leak occurring from the battery system having the gas leak present in at least one of the video frames; determining a physical location of the gas leak on the battery system; and identifying a leak intensity value of the gas leak.

In another aspect of the present disclosure, the method further includes: identifying a frame of the video having the gas leak present; and subtracting a background frame of the video not having the gas leak present from the frame of the video having the gas leak present to obtain a frame difference having image data defining the gas leak.

In another aspect of the present disclosure, the method further includes: passing the frame difference having image data defining the gas leak through a classification network; and generating a gas leak signal.

In another aspect of the present disclosure, the method further includes: identifying multiple frame differences individually having image data defining the gas leak; performing a summation of the multiple frame differences; and determining a sum of total pixel values in the multiple frame differences to identify an image frame of the gas leak applying pixel thresholding.

In another aspect of the present disclosure, the method further includes: fitting a contour to image data defining the gas leak within the frame difference; and applying a bounding shape over the contour wherein known coordinates of the bounding shape identify a physical location of the gas leak.

In another aspect of the present disclosure, the method further includes performing a summation of multiple ones of the frame difference, where the summation is equal to a sum of pixel values in the multiple ones of the frame difference; wherein if the sum of the pixel values is greater than one of multiple predetermined thresholds, the leak intensity value defines one of a low intensity leak, a medium intensity leak or a high intensity leak.

In another aspect of the present disclosure, the method further includes: saving a calibration file having multiple values of $I^i xy$ defining coordinates in individual ones of the video frames; identifying the location of the gas leak as an Lxy value in an image of one of the video frames; computing an i value where i is equal to an argument of a minimum (argmin) multiplied by an absolute value of $Lxy-I^i xy$; and mapping at least one of the values of $I^i xy$ to a gas leak location using the calibration file.

According to several aspects, a method to perform automated gas leak detection during battery manufacturing of a vehicle battery system defining a RESS, a battery cell, a battery module, or a battery pack comprises: collecting image data of a video of the vehicle battery system having multiple video frames saved during a manufacturing stage of the battery system; detecting a gas leak occurring having the gas leak present in at least one of the video frames with the gas leak as a gas vapor escaping from a surface of the battery system to atmosphere; determining a location of the gas leak applying one of an object detection analysis or a frame-by-frame analysis or a classifier model; and identifying a leak intensity value of the gas leak to determine if the gas leak is minor and is less than or within a predetermined window or threshold permitting acceptance of the gas leak without repair, or if the gas leak requires further action including repair of the battery system.

In another aspect of the present disclosure, the method further includes: defining a boundary encompassing the gas leak to identify a location or position of the gas leak; and identifying coordinates of the boundary to identify the location of the gas leak.

In another aspect of the present disclosure, the method further includes: capturing at least one frame of the video during the frame-by-frame analysis containing a visual image of a gas leak; and subtracting a background frame of the video not having the gas leak present from the at least one of the multiple video frames of the video having the gas leak present to obtain a frame difference having image data defining the gas leak.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When a component, element or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be in intervening elements or layers present. Other words used to describe the relationship between elements should be interpreted in a like fashion, such as "between" versus "directly between", "adjacent" versus "directly adjacent", and the like. As used herein, the term "and/or" and "one or both" include any and all combinations of one or more of the associated listed items.

Figures 1, 2:
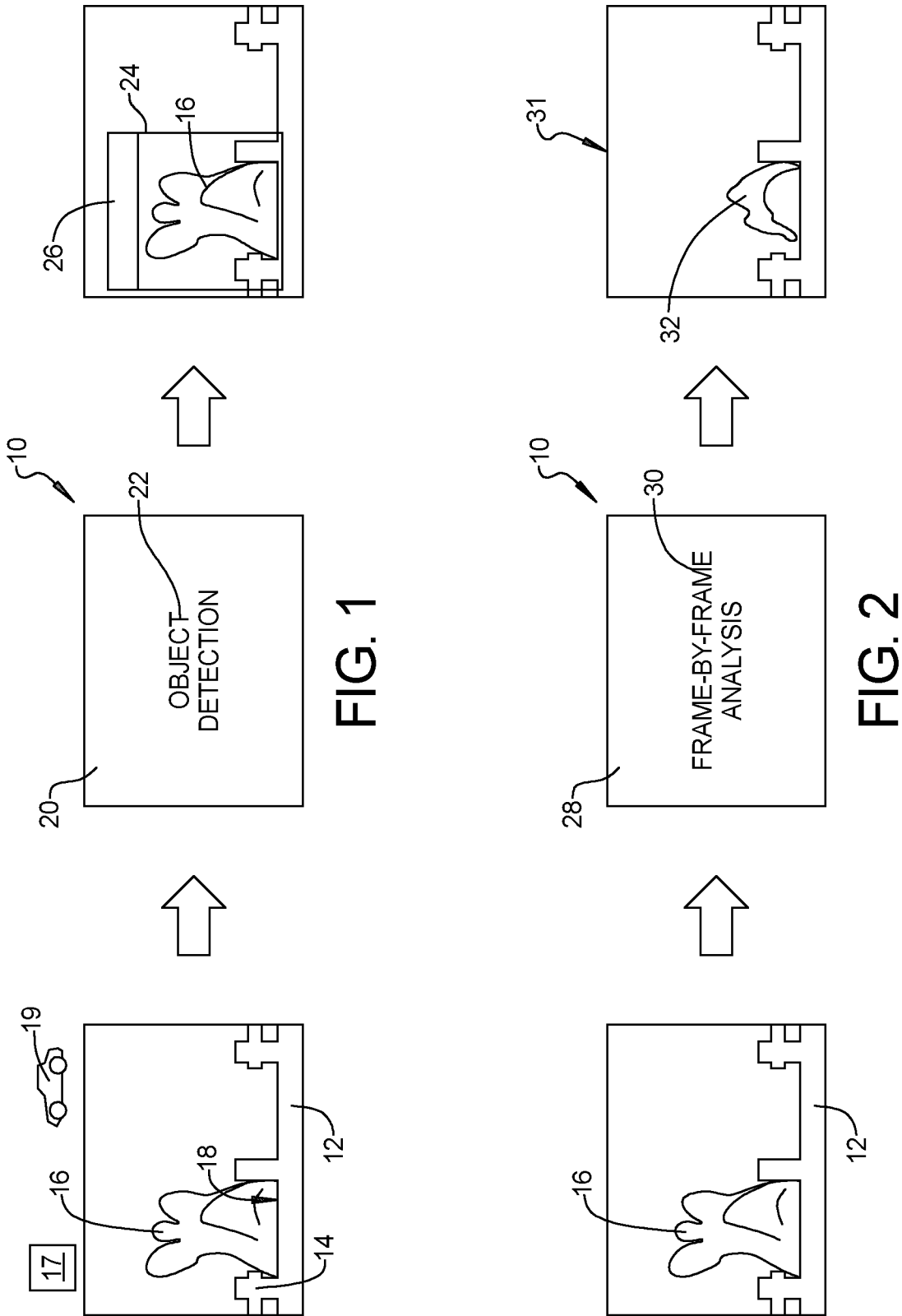
FIG. 1 is a flow diagram of steps taken to detect a gas leak according to an exemplary aspect.
FIG. 2 is a flow diagram of a frame-by-frame analysis approach to identify a gas leak.
Figure 3:
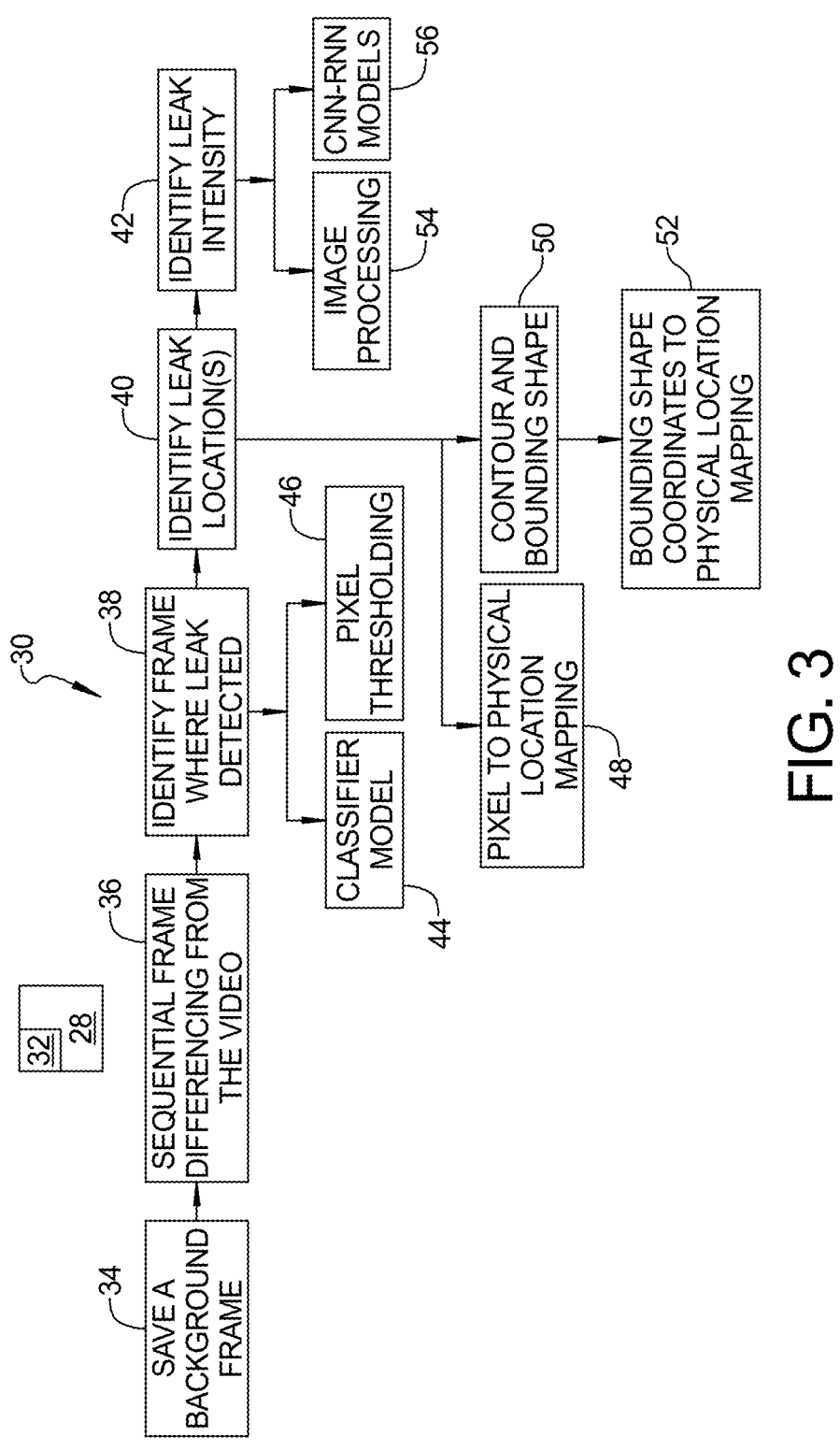
FIG. 3 is a system flow diagram of multiple automated steps to detect and identify a gas leak applying video imaging and analysis of multiple video images applying a frame-by-frame analysis.

Referring to FIG. 1, an automated gas leak detection during battery manufacturing system 10 automates detection and identification of specific locations and intensities of gas leaks from a rechargeable energy storage system (RESS), a cell, a module, and/or a battery pack, hereinafter collectively identified as a battery system during a manufacturing process of the battery system using image data and/or video data from an optical gas imaging system. The automated gas leak detection during battery manufacturing system 10 may be applied to automatically perform gas leak detection for an enclosure of the battery system in the form of a RESS, a battery cell, a battery module, or a battery pack during a manufacturing stage of the battery system.

In the present example, a battery cell 12 of a battery system 14 defining a RESS, a battery cell, a battery module, or a battery pack has one or more features including terminals. In the example shown a gas leak 16 is occurring during a manufacturing stage of the battery cell 12 with the gas leak 16 as a gas vapor detected using an optical gas imaging system 17. The gas vapor is shown escaping from a surface 18 of the battery cell 12 to atmosphere. According to several aspects, the battery system 14 is installed in or is intended to be installed in a vehicle 19 such as but not limited to a battery electric vehicle, a gas/electric hybrid vehicle, a sport utility vehicle, a truck, a van or the like.

With continuing reference to FIG. 1, using the optical gas imaging system 17, in a detection phase 20 an object detection 22 is performed which identifies the gas leak 16. To define a location or position of the gas leak 16, a boundary 24 is defined which encompasses the gas leak 16. Coordinates of the boundary 24 are identified or are known. According to several aspects, to provide a capability of determining if the gas leak 16 is minor and is less than or within a predetermined window or threshold permitting acceptance of the gas leak 16 without repair, or if the gas leak 16 is serious and requires further action including repair of the battery system 14, the gas leak 16 may be assigned a leak intensity value 26 which is described in greater detail in reference to FIGS. 3, 13, 14, 15 and 16 herein.

Referring to FIG. 2 and again to FIG. 1, in lieu of performing the detection phase 20 to identify a specific object which may define the gas leak 16, a video 28 of the same battery cell 12 may be generated which permits a frame-by-frame analysis 30 of the gas leak 16. The frame-by-frame analysis 30 permits at least one frame 31 to be captured which contains a visual image 32 of a gas leak.

Referring to FIG. 3 and again to FIG. 2, according to further aspects, the frame-by-frame analysis 30 may be conducted to identify and quantify the gas leak visual image 32 from the battery system 14. In an initiating step 34, a background frame of for example a video of the battery system over time presenting no gas leakage is saved. In a differencing step 36 sequential frame differencing is performed from the video of the battery system to identify if differences such as a gas leak have occurred from the battery system at some point following identification of the background frame. In an identification step 38, at least one individual frame from the sequential frame differencing step where a gas leak is detected is identified. In a location identification step 40, a location in the battery system where the gas leak is occurring is identified. Following the location identification step 40, a leak intensity step 42 is performed to differentiate a leak intensity is estimated based on comparison to known gas leak intensity imaging.

Following the identification step 38, a leak classification step 44 is performed applying a classifier model. At the same time, a thresholding step 46 is performed to identify a pixel threshold of the image of the detected gas leak is identified.

Following the location identification step 40 further differentiation of the leak location is performed by a mapping step 48 wherein pixel to physical location mapping is performed. In parallel with the mapping step 48, a vented gas shape identification step 50 is performed wherein a contour and a bounding shape of the detected gas leak is performed. Following the vented gas shape identification step 50 a bounding step 52 is performed wherein shape coordinates of the bounding shape of the detected gas leak are bound and mapped to a physical location of the gas leak.

Following the leak intensity step 42 an image processing step 54 is performed to apply image data of the gas leak to known patterns or known images of gas leaks saved in a database as an initial step to quantify a gas leak intensity. This data may then be compared to the previous saved data to help determine if the detected gas leak is occurring which is of a predetermined volume compared to a gas leak less than a predetermined threshold. A gas leak less than the predetermined threshold may be deemed to be acceptable and therefore does not require battery system repair. In parallel with the image processing step 54 the image data of the gas leak may be entered into different models to further quantify a gas leak intensity. For example, a convolutional neural network (CNN) model and/or a recurrent neural network (RNN) model 56 may be used. A CNN model is considered to be more potent than an RNN model, and is ideal for imaging and video processing, as CNN modeling learns to recognize patterns across space, while RNN models are useful for solving temporal data problems. RNN is ideal for text and speech analyses, with RNN models having recurrent connections while CNN models do not necessarily have them. RNN models also allow arbitrary input length and output length.

Figures 4, 5:
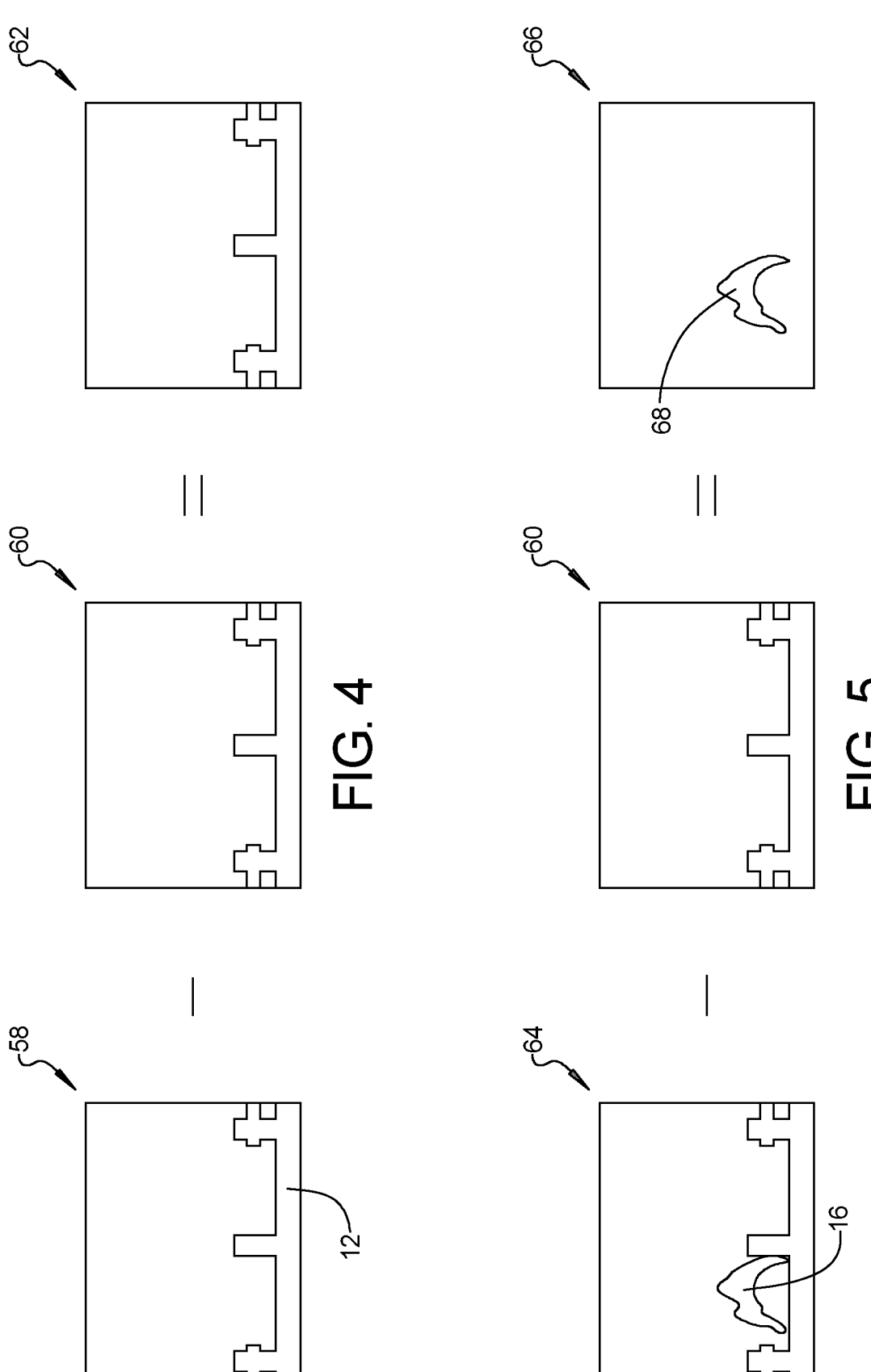
FIG. 4 is a video frame comparison subtracting image data from a background frame from a frame presenting no gas leakage go obtain a frame difference signifying no gas leak.
FIG. 5 is a video frame comparison subtracting image data from a background frame from a frame presenting a gas leak to obtain a frame difference signifying a gas leak.

Referring to FIGS. 4 and 5, frame differencing may be applied to identify a gas leak. Referring more specifically to FIG. 4, initially, a frame without a leak 58 is collected from image data of a battery cell such as the battery cell 12 described in reference to FIG. 1, from which a background frame 60 is subtracted. The background frame 60 may be saved in and retrieved from a database or memory and provides an image of the battery cell 12 presenting no gas leak. A first frame difference 62 in the present example therefore includes no image data defining a gas leak.

Referring to FIG. 5, frame differencing is further applied to a frame having a leak 64, from which the background frame 60 is also subtracted. A second frame difference 66 in the present example includes image data 68 defining a gas leak.

Figures 6, 7:
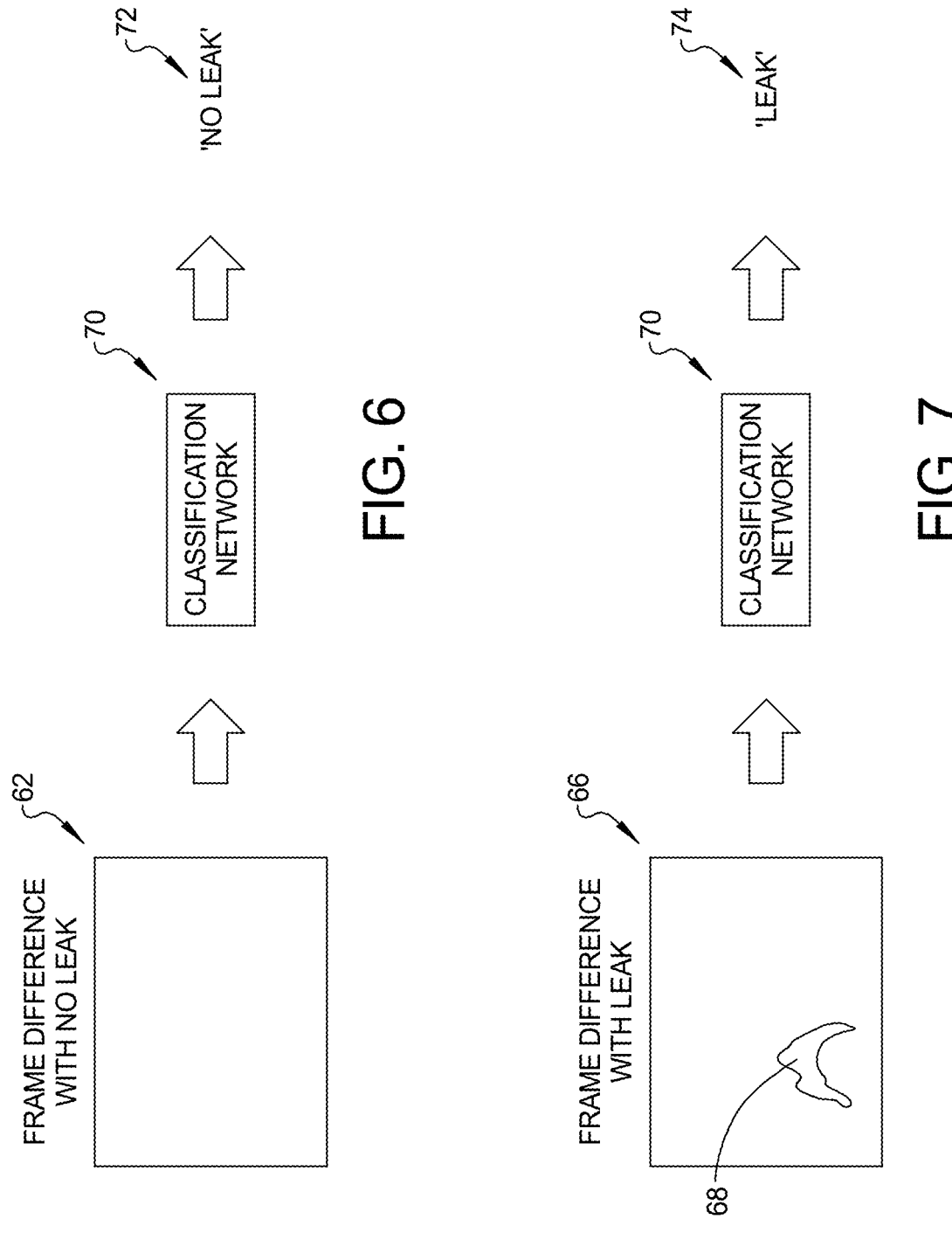
FIG. 6 is a video frame difference having no gas leak which is passed through a classification network resulting in a no gas leak signal.
FIG. 7 is a video frame difference having a gas leak which is passed through the classification neural network resulting in a gas leak signal.

Referring to FIG. 6, an image frame identifying a gas leak may be identified by applying a classifier model such as a classifier neural network 70 to the first frame difference 62. A no-leak signal 72 is generated by the classifier neural network 70 in the present example.

Referring to FIG. 7 and again to FIG. 6, the classifier neural network 70 is applied to the second frame difference 66. A gas leak signal 74 is generated by the classifier neural network 70 in this example resulting from classification of the image data 68 defining the gas leak.

Figures 8, 9:
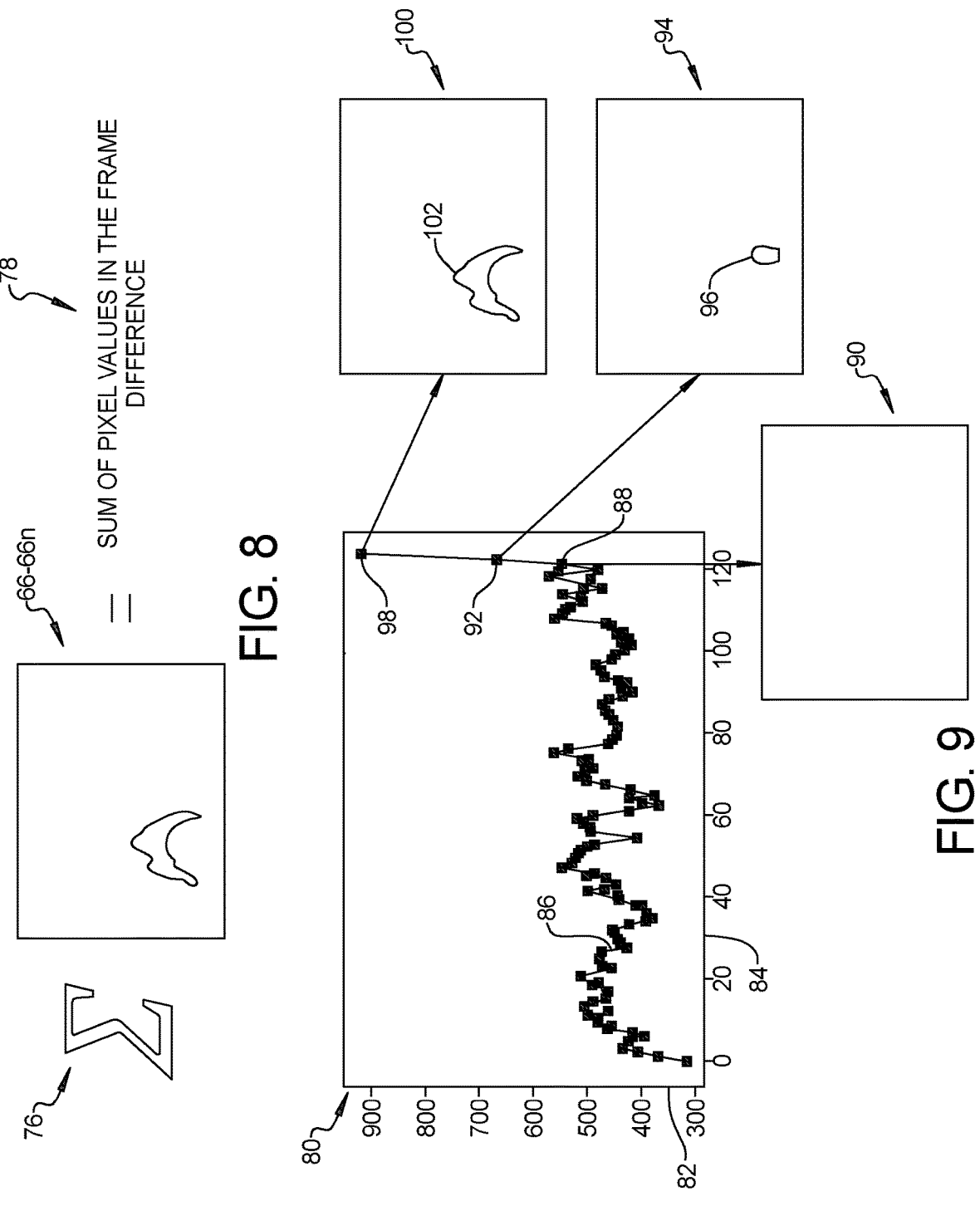
FIG. 8 is a video frame difference summed to obtain a sum of pixel values in the video frame difference.
FIG. 9 is a graph of pixel value differences for a frame difference presenting no gas leak, a medium gas leak and a high gas leak.

Referring to FIG. 8, an image frame identifying a gas leak may also be identified applying pixel thresholding as follows. A summation 76 is performed of for example multiple ones of the second frame differences 66 to 66$n$. The summation 76 results in a sum 78 of total pixel values in the multiple ones of the second frame differences 66 to 66$n$.

Referring to FIG. 9 and again to FIG. 8, the sum 78 of total pixel values of the multiple ones of the second frame differences 66 to 66$n$ may be presented in a graph 80 comparing a sum of pixel values 82 to a frame number 84 of the image data collected over a time period of for example the battery cell 12. A curve 86 presents pixel summation data from frame to frame. A first datapoint 88 along the curve 86 represents a first non-gas leak frame 90 presenting results similar to the results presented by the first frame difference 62. A second datapoint 92 may be represented as a second gas leak frame 94 having a sum of pixel values representing a low gas leak 96. A third datapoint 98 at a peak of the curve 86 may be represented as a third gas leak frame 100 having a sum of pixel values representing a high gas leak 102.

Figure 10:
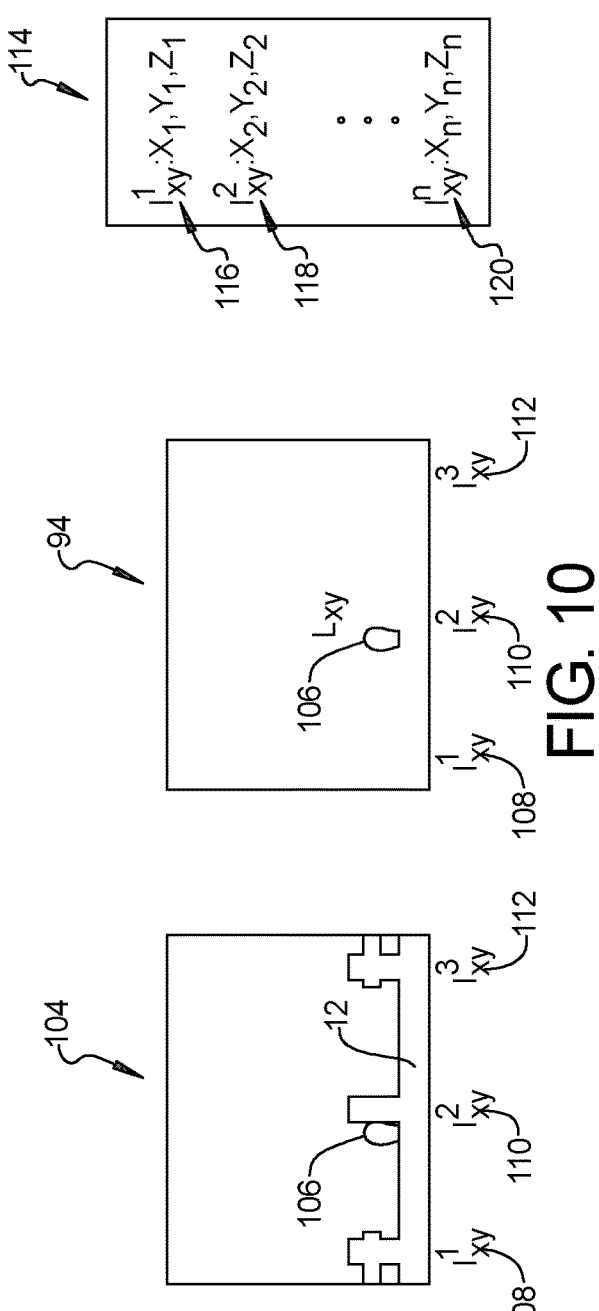
FIG. 10 is a flow diagram of a gas leak image, a coordinate mapping of the gas leak and a calibration file applied to map the gas leak location.

Referring to FIG. 10, a location of a gas leak occurring for example from the battery cell 12 is determined by applying a direct pixel to physical location mapping approach. A 2-dimensional (2D) image 104 identifies a minor or low gas leak 106 proximate to one of three potential leak locations 108, 110, 112 also defined as horizontal locations $I^1xy$, $I^2xy$ and $I^3xy$ respectively, and according to the present example is positioned approximately at location 110 $I^2xy$. The horizontal locations $I^1xy$, $I^2xy$ and $I^3xy$ values are provided as examples, and may include more or less than three locations at the discretion of the program designer. Any Ixy leak location may be presented on the second gas leak frame 94 such as low gas leak 106. Values of the Ixy locations may be compared to values saved in a calibration file 114 which provides baseline values of X, Y, Z coordinates for a first $I^1xy$ value 116, a second $I^2xy$ value 118 and up to an nth $I^Nxy$ value 120.

Figure 11:
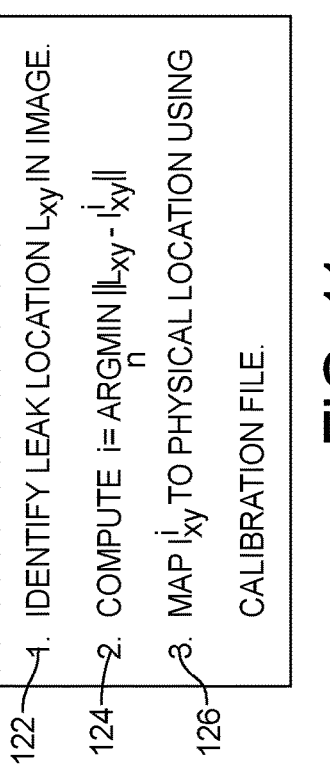
FIG. 11 is a diagram of steps taken to map a physical location of a gas leak.

Referring to FIG. 11 and again to FIG. 10, three steps may be used to map any Ixy gas leak location. In a first leak location step 122, a gas leak location Lxy is identified in an image such as a photographic image of a battery. In a second leak location step 124, the computation of an i value is equal to the argument of the minimum (argmin) N multiplied by the absolute value of Lxy–I$^i$xy. In a third leak location step 126, the I$^i$xy value is mapped to a physical location using the calibration file 114 identified in reference to FIG. 10.

Figure 12:
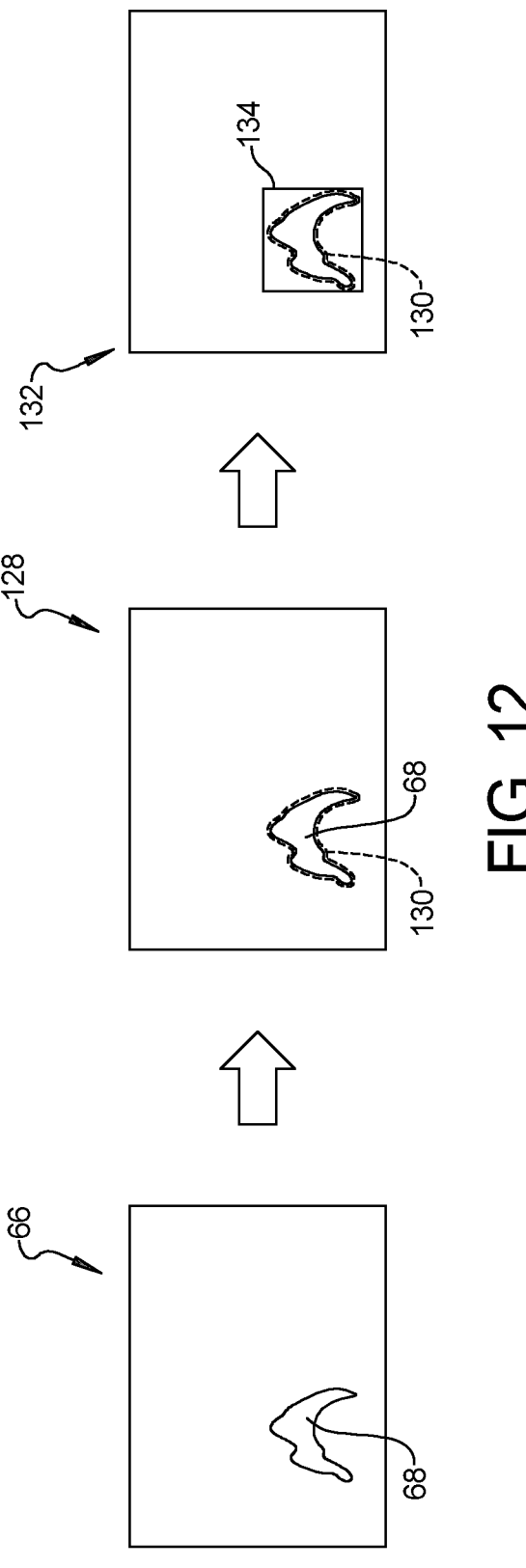
FIG. 12 is a flow diagram of a gas leak image, a contour fitted to the gas leak image and a bounding shape after fitting to the contour.

Referring to FIG. 12, a location of a gas leak occurring for example from the battery cell 12 is determined by applying a contour and a bounding shape approach. Initially, in a first fitting step 128, a frame difference such as the second frame difference 66 described in reference to FIG. 5 has a contour 130 fitted to the image data 68 defining the gas leak. In a following second fitting step 132, a bounding shape 134 such as a rectangle shape is then fit over the contour 130. Coordinates of the bounding shape 134 are known and may therefore by used to identify a physical location of the gas leak. According to other aspects, in addition to the rectangular shaped bounding shape 134, other bounding shapes including but not limited to a circle, an ellipse and the like may be used.

Figures 13, 14:
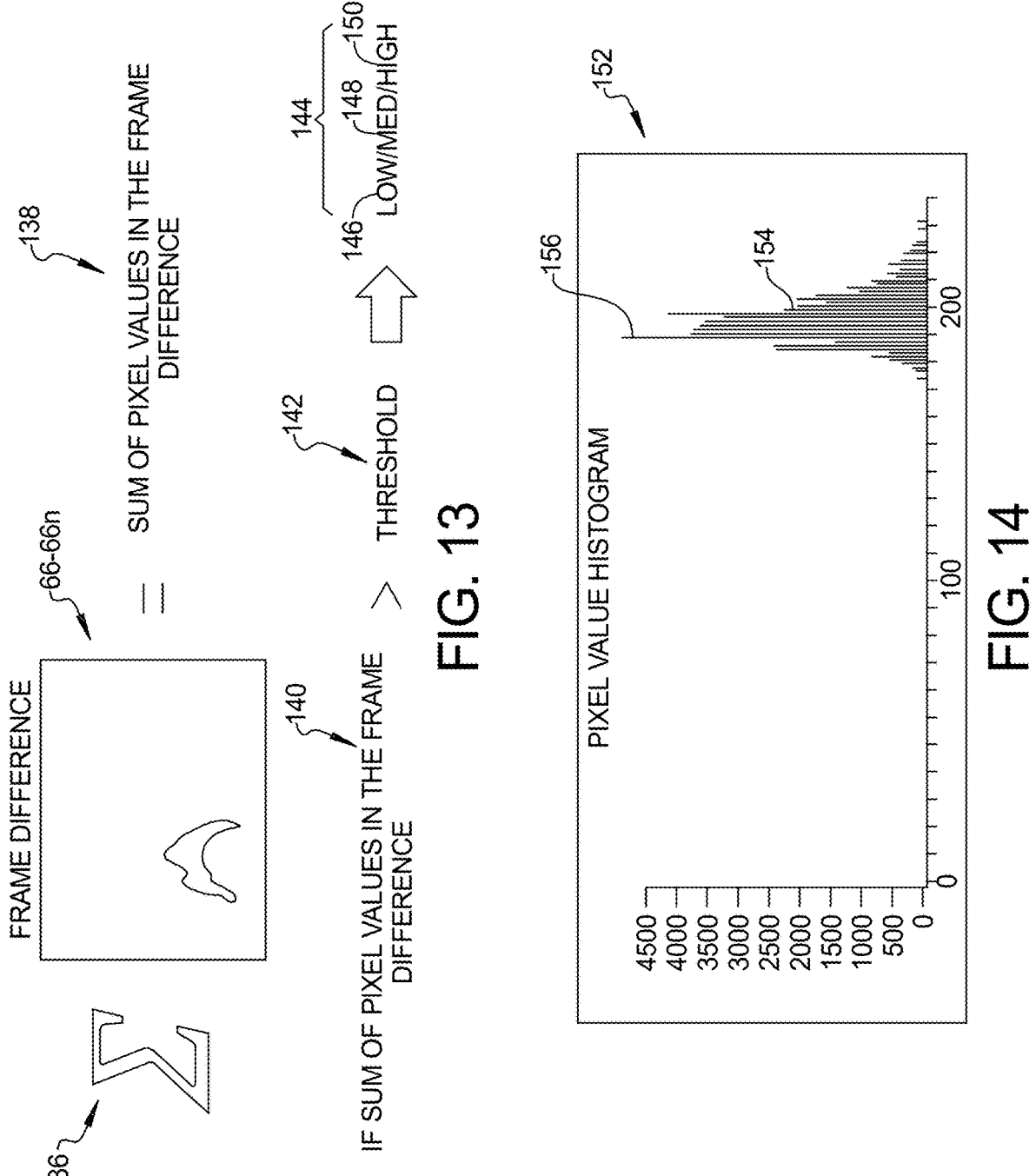
FIG. 13 is a flow diagram of summation steps to identify a sum of pixel values in a frame difference.
FIG. 14 is a graph of histograms used to identify gas leak intensity values.

Referring to FIG. 13, a leak intensity may be determined by applying image processing, to for example distinguish the leak intensity as a low intensity, a medium intensity or a high intensity leak. This is accomplished by a summation 136 performed of multiple frame differences including the second frame difference 66 up to a frame difference 66N. The summation 136 is equal to a sum of pixel values 138 in the frame differences. If a sum of the pixel values 140 in the frame difference is greater than one of multiple predetermined thresholds 142, a leak intensity 144 may be determined as a low intensity leak 146, a medium intensity leak 148 or a high intensity leak 150 by a difference between the sum of the pixel values 140 and the predetermined threshold 142.

Referring to FIG. 14, by applying a statistical approach a leak intensity may be identified by use of statistics of multiple pixel value histograms overlaid on a graph 152. These may include for example a first pixel value histogram 154 identifying a net lower leak intensity than a second pixel value histogram 156 identifying a net higher leak intensity indicated via higher statistical average pixel values.

Figures 15, 16:
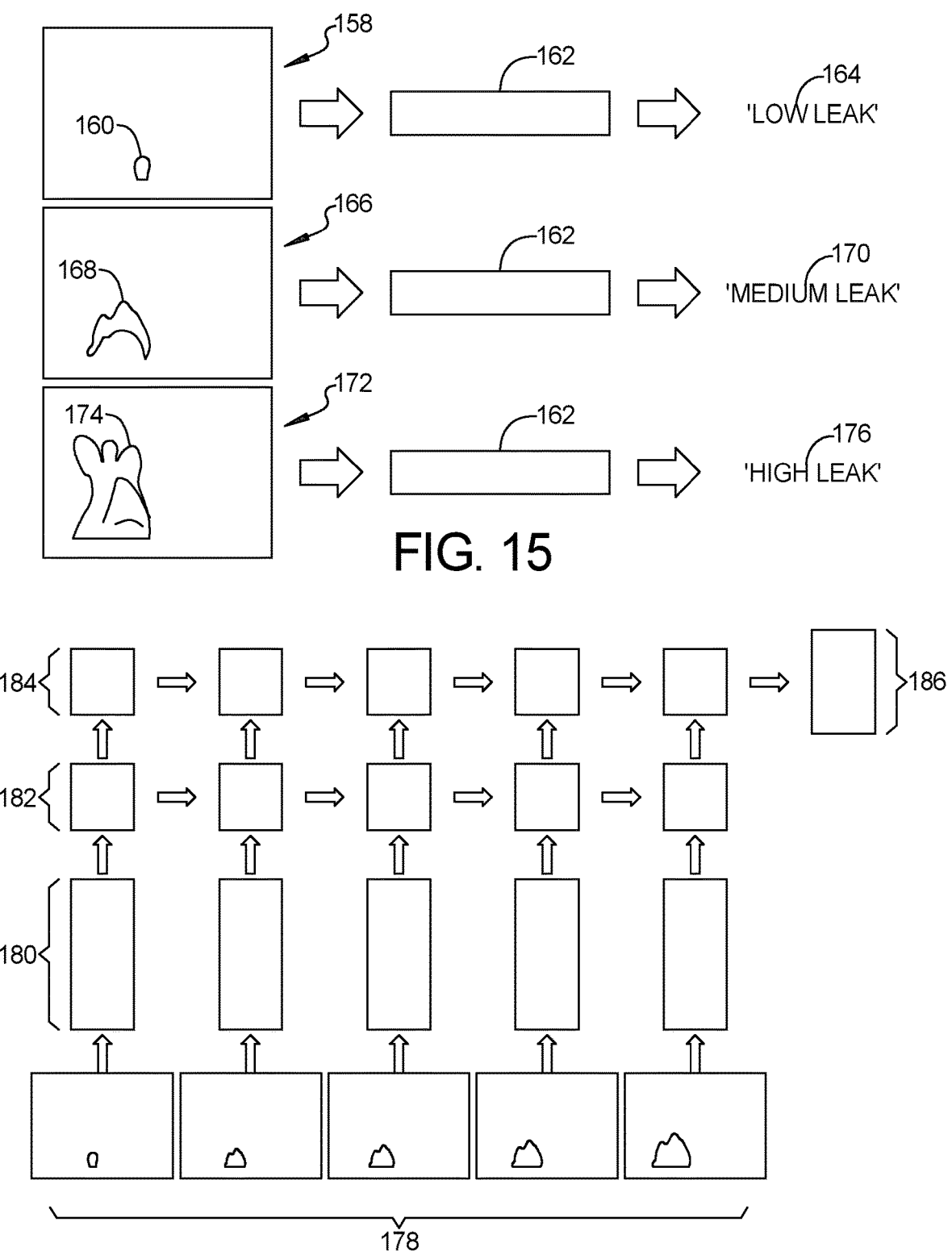
FIG. 15 is a flow diagram applying a convolutional neural network to identify gas leak flow intensity values.
FIG. 16 is a flow diagram applying a recurrent neural network together with a convolutional neural network to identify gas leak flow intensity values.

Referring to FIGS. 15 and 16, a gas leak intensity may also be identified using a convolutional neural network (CNN) model and/or a recurrent neural network (RNN) model. Referring specifically to FIG. 15, data from different images of gas leak frames are fed to a CNN classifier which determines a leak rate. In a first detection step 158, image data defining a first non-gas leak 160 is fed to a CNN classifier 162 which outputs a no or low leak signal 164. In a second detection step 166, image data defining a second gas leak 168 is fed to the CNN classifier 162 which outputs a medium leak signal 170. In a third detection step 172, image data defining a third gas leak 174 is fed to the CNN classifier 162 which outputs a high leak signal 176.

Referring specifically to FIG. 16, an analysis is conducted of a next N frames of video images after a gas leak is first detected to identify if the gas leak is low, medium or high. In the example shown, a gas leak is first detected in a frame 1 and is followed by any changes in the gas leak in following frames 2 through 5. CNN features 180 of individual ones of the frames 1 through 5 are passed to a first simple RNN 182. An output of the first simple RNN 182 is passed to a second simple RNN 184. Gas leak intensities may be differentiated for the individual frames as one of a low leak, a medium leak or a high leak, with a resultant leak signal identified at an output 186.

In the example given in FIG. 16, if the gas leak detected in frame 1 is a low gas leak, and the image data does not change in the following frames such as from frames 2 through 5, the output 186 will identify a low gas leak. If the gas leak detected in frame 1 changes to a medium gas leak for example by frame 3, and thereafter remains substantially the same, the output 186 will identify a medium gas leak. If the gas leak detected in frame 1 continuously increases in intensity to a high gas leak by frame 5, the output 186 will identify a high gas leak.

Automation of detection and identification of an intensity and specific locations of gas leaks using image and/or video data from an optical gas imaging system. The automated gas leak detection during battery manufacturing system 10 may be applied to gas leak detection for an enclosure of a rechargeable energy storage system (RESS), battery cell, battery module, or battery pack during manufacturing.

An automated gas leak detection during battery manufacturing system 10 of the present disclosure offers several advantages. These include image processing and deep learning based methods that automate detection and identification of specific locations and intensity of gas leaks using image and/or video data from an optical gas imaging system. The automated gas leak detection during battery manufacturing system 10 may be applied to gas leak detection for an enclosure of a rechargeable energy storage system (RESS), battery cell, battery module, or battery pack during manufacturing.

What is claimed is:

1. A method to perform automated battery gas leak detection, comprising:

collecting a video of a vehicle battery system having multiple video frames during a manufacturing stage of the battery system;

detecting a gas leak occurring from the battery system having the gas leak present in at least one of the video frames;

determining a physical location of the gas leak on the battery system;

identifying a leak intensity value of the gas leak;

subtracting a background frame of the video not having the gas leak present from the at least one of the multiple video frames of the video having the gas leak present to obtain a frame difference having image data defining the gas leak;

identifying multiple frame differences individually having image data defining the gas leak;

performing a summation of the multiple frame differences; and determining a sum of total pixel values in the multiple frame differences to identify an image frame of the gas leak applying pixel thresholding.

2. The method of claim 1, further including:

passing the frame difference having image data defining the gas leak through a classification neural network; and generating a gas leak signal.

3. The method of claim 1, further including:

fitting a contour to image data defining the gas leak located within the frame difference; and applying a bounding shape over the contour wherein known coordinates of the bounding shape identify a location of the gas leak.

4. The method of claim 1, further including performing a summation of multiple ones of the frame difference, where the summation is equal to a sum of pixel values in the multiple ones of the frame difference; and wherein if the sum of the pixel values is greater than one of multiple predetermined thresholds, the leak intensity value defines one of a low intensity leak, a medium intensity leak or a high intensity leak.

5. The method of claim 1, further including:

saving a calibration file having multiple values of $I^i xy$ defining coordinates in individual ones of the video frames;

identifying the location of the gas leak as an Lxy value in an image of one of the video frames;

computing an i value where i is equal to an argument of a minimum (argmin) multiplied by an absolute value of $Lxy-I^i xy$; and mapping at least one of the values of $I^i xy$ to a gas leak location using the calibration file.

6. A method to perform automated battery gas leak detection, comprising:

collecting a video of a vehicle battery system having multiple video frames during a manufacturing stage of the battery system;

detecting a gas leak occurring from the battery system having the gas leak present in at least one of the video frames;

determining a physical location of the gas leak on the battery system;

identifying a leak intensity value of the gas leak;

subtracting a background frame of the video not having the gas leak present from the at least one of the multiple video frames of the video having the gas leak present to obtain a frame difference having image data defining the gas leak;

performing a summation of multiple ones of the frame difference, where the summation is equal to a sum of pixel values in the multiple ones of the frame difference; and wherein if the sum of the pixel values is greater than one of multiple predetermined thresholds, the leak intensity value defines one of a low intensity leak, a medium intensity leak or a high intensity leak.

7. A method to perform automated battery gas leak detection, comprising:

collecting a video of a vehicle battery system having multiple video frames during a manufacturing stage of the battery system;

detecting a gas leak occurring from the battery system having the gas leak present in at least one of the video frames;

determining a physical location of the gas leak on the battery system;

identifying a leak intensity value of the gas leak;

subtracting a background frame of the video not having the gas leak present from the at least one of the multiple video frames of the video having the gas leak present to obtain a frame difference having image data defining the gas leak;

saving a calibration file having multiple values of $I^i xy$ defining coordinates in individual ones of the video frames;

identifying the location of the gas leak as an Lxy value in an image of one of the video frames;

computing an i value where i is equal to an argument of a minimum (argmin) multiplied by an absolute value of $Lxy-I'xy$; and mapping at least one of the values of $I'xy$ to a gas leak location using the calibration file.

*    *    *    *    *